United States Patent [19]

Sakabe et al.

[11] Patent Number: 4,764,494

[45] Date of Patent: Aug. 16, 1988

[54] DIELECTRIC CERAMIC COMPOSITIONS AND PROCESS FOR PRODUCING THE SAME

[75] Inventors: Ken-ichi Sakabe, Yokohama; Shingo Kimura, Ebina; Kageyasu Akashi, Tokyo, all of Japan

[73] Assignee: Asahi Kasei Kogyo Kabushiki Kaisha, Japan

[21] Appl. No.: 59,190

[22] Filed: Jun. 11, 1987

Related U.S. Application Data

[63] Continuation of Ser. No. 855,345, Apr. 24, 1986, abandoned.

[30] Foreign Application Priority Data

Apr. 26, 1985 [JP] Japan ............................ 60-88909
Sep. 18, 1985 [JP] Japan ............................ 60-204378
Sep. 25, 1985 [JP] Japan ............................ 60-210311

[51] Int. Cl.$^4$ .................... C04B 35/46; C04B 35/49
[52] U.S. Cl. .................... 501/138; 501/136; 501/139
[58] Field of Search .................... 501/138, 139, 136; 361/321

[56] References Cited

U.S. PATENT DOCUMENTS

| | | | |
|---|---|---|---|
| 3,340,074 | 9/1967 | Herczog | 501/138 OR |
| 4,082,906 | 4/1978 | Amin et al. | 501/137 X |
| 4,222,885 | 9/1980 | Hennings et al. | 501/139 X |
| 4,244,830 | 1/1981 | Hennings et al. | 501/138 OR |
| 4,283,753 | 8/1981 | Burn | 501/137 X |
| 4,400,759 | 8/1983 | Lagrange et al. | 501/138 X |
| 4,400,760 | 8/1983 | Lagrange et al. | 501/138 X |
| 4,430,689 | 11/1984 | LaGrange et al. | 361/321 |
| 4,475,144 | 7/1984 | LaGrange et al. | 361/321 |

FOREIGN PATENT DOCUMENTS

| | | | |
|---|---|---|---|
| 0067092 | 12/1982 | European Pat. Off. | 501/138 |
| 2941304 | 4/1980 | Fed. Rep. of Germany | 501/137 |
| 160963 | 7/1982 | Japan . | |
| 20781 | 4/1983 | Japan . | |
| 135178 | 10/1983 | Japan . | |

OTHER PUBLICATIONS

Swilan et al., Trans. Brit. Ceram. Soc. 74, 165–169 (1975).
Desgardin et al., Am. Ceram. Soc. Bull. 64[4] 564–570 (1985).
Haussonne et al. J.A.C.S. vol. 66, No. 11, 801–807 (1983).
Handbook of Chemistry, pp. 264–265; 280–281; 346–347.
Alfa Catalog (1983–1984) pp. 164–165.
Ceramic Bulletin, vol. 64, No. 4 (1985) p. 566.
Encyclopedia Chimica, p. 873.
J. M. Haussonne, Barium Titanate Perovskite Sintered with Lithium Fluoride, Jour. American Ceramic Soc., vol. 66, No. 11, pp. 801–807.

*Primary Examiner*—Mark L. Bell
*Assistant Examiner*—Karl Group
*Attorney, Agent, or Firm*—Finnegan, Henderson, Farabow, Garrett & Dunner

[57] ABSTRACT

A dielectric ceramic composition comprising 87.5 to 99.6 mole % of barium titanate as a first component, 0.2 to 7.0 mole % of copper oxide as a second component, 0.2 to 5.5 mole % of at least one member selected from the group consisting of lithium oxide, zinc oxide, cadmium oxide and iron oxide as a third component, and if necessary, at least one complex oxide selected from the group consisting of lead titanate, strontium titanate, calcium titanate, magnesium titanate, barium zirconate, calcium zirconate, strontium zirconate, lead zirconate, magnesium zirconate, lead stannate, calcium stannate, strontium stannate, barium stannate and magnesium stannate, as a fourth component in an amount of 0.3 to 40.0 moles per 100 moles of the sum of the first, second and third components; and a process for producing said dielectric ceramic composition.

28 Claims, No Drawings

# DIELECTRIC CERAMIC COMPOSITIONS AND PROCESS FOR PRODUCING THE SAME

This application is a continuation of application Ser. No. 885,345, filed 4/26/86, now abandoned.

BACKGROUND OF THE INVENTION

1. Field of the Invention

This invention relates to a dielectric ceramic composition which is produced by using barium titanate as a base and is suitable for use in capacitors, and a process for producing the same.

2. Description of the Prior Art

Barium titanate and compositions prepared by mixing barium titanate with shifters and depressers have heretofore been sintered at a high temperature of 1,300° to 1,400° C. and used in capacitors. However, when they are sintered at such a high temperature, there are caused wear of a setter made of expensive zirconia or the like and a sintering furnace, and moreover a large amount of energy is necessary for the sintering. Therefore, the cost of the resulting capacitor is high. Further, in order to produce a multilayer ceramic capacitor by using the conventional composition, an expensive noble metal such as platinum or palladium which can withstand a high sintering temperature should be used as a material for inner electrodes, and the cost of the resulting multilayer ceramic capacitor is very high. Accordingly, there is ardently desired a dielectric ceramic composition capable of being sintered at a low temperature which permit reduction of the wear of a setter and a sintering furnace, and also employment of inner electrodes comprising inexpensive silver as the main constituent for producing a multilayer ceramic capacitor.

On the other hand, for practical use in a capacitor, there is needed, as a composition having a high relative permittivity, a dielectric ceramic composition satisfactory in X7R characteristic, Z5 characteristic and Y5V characteristic of EIA standard and B characteristic and F characteristic of JIS standard. As to X7R characteristic and B characteristic, the composition should have a relatively high relative permittivity, and the temperature dependence of the relative permittivity should be small. As to Z5V characteristic, Y5V characteristic and F characteristic, the temperature dependence of the relative permittivity may be large but the relative permittivity should be very high.

In order to obtain a multilayer ceramic capacitor of small size and large capacity according to either of the above-mentioned standards, the relative permittivity of dielectric ceramic composition should be high and the thickness of dielectric layer between internal electrodes should be thin. When the grain size of sintered body is large and not uniform, the breakdown voltages is lowered, so that problems are caused in practice. Therefore, there is particularly ardently desired a dielectric ceramic composition which has a high relative permittivity, a uniform and very small grain size, and can be sintered at a low temperature.

Systems containing bismuth oxide have been put to practical use as a composition capable of being sintered at a low temperature, but are disadvantageous, for example, in that they have a low relative permittivity, that bismuth is volatilized during sintering, resulting in unstable production, and that the dielectric loss is large in high-frequency regions. Therefore, they are eagerly desired to be improved.

On the other hand, copper oxide is known as one of sintering aids which are free from the disadvantages of the above-mentioned bismuth systems and can lower the sintering temperature of barium titanate. It is shown in Trans. Brit. Ceram. Soc., 74, 165, (1975) that a sintered body having a substantially theoretical density can be obtained at a sintering temperature of 1,200° C. by adding cupric oxide to barium titanate in an amount of 0.5 mole % less based on the total amount.

U.S. Pat. No. 4,244,830 discloses a production method which comprises adding a compound capable of forming a $CuO-Cu_2O$ eutectic mixture or a $CuO-Cu_2O \cdot Me^{IV}O_2$ eutectic mixture (wherein $Me^{IV}O_2$ is an oxide of at least one element selected from the elements in group IV and is not incorporated into a perowskite lattice) to perowskite-forming compounds, and sintering the resulting mixture in the temperature range of 1,000° to 1,250° C.

However, dielectric ceramics obtained by these methods have large and unever grain sizes, and in some cases, giant grains having a size of as large as several tens microns are produced. Therefore, the dielectric ceramics have unstable characteristics and are substantially unusable particularly in multilayer ceramic capacitors.

On the other hand, U.S. Pat. No. 4,222,885 discloses a method for producing dielectirc ceramics which comprises adding an oxide capable of forming a $CuO-MeOx$ (wherein MeOx is an oxide of at least one element selected from the elements in III, V, VI and VII groups of the periodic table and is not incorporated into a perowskite lattice) eutectic mixture to perowskite-forming compounds, and sintering the resulting mixture in the temperature range of 1,000° to 1,250° C. According to this method, a sintered body having relatively small and uniform grains can also be obtained, but the dielectric loss (tan δ) is large, so that the method involves problems in practice. Thallium gives the dielectric ceramic having the best characteristics, but it is highly toxic and expensive, which becomes a serious problem in practice.

As another sintering aid capable of lowering the sintering temperature of barium titanate, lithium fluoride is known. U.S. Pat. No. 4,082,906 discloses a composition containing 90 to 99.75% by weight of barium titanate and 0.25 to 10% by weight of lithium fluoride. Japanese Patent Application Kokai (Laid-Open) No. 160963/82 discloses a composition containing 1.5 to 10% by weight of lithium fluoride. Further, Japanese Patent Application Kokai (Laid-Open) No. 135178/83 discloses a method using a combination of 0.5 to 2.5% by weight of lithium oxide and 1.5 to 8% by weight of zinc fluoride. Japanese Patent Application Kokai (Laid-Open) No. 20781/83 discloses a method using a combination of 0.5 to 2.5% by weight of lithium oxide and 1.5 to 8% by weight of cupric fluoride.

However, addition of fluoride of lithium, a univalent metal in a large amount of 0.25 to 10% by weight is disadvantageous in that the durabilities such as high-temperature load characteristic (life test), moisture resistance characteristic and the like are liable to be deteriorated. Further, since fluorides such as lithium fluoride and the like are highly volatile compounds, their employment is disadvantageous in that when a composition containing them in a large amount is sintered, deformation of a sintered body is apt to be caused, so that a stable product is difficult to obtain.

In addition, a system containing lithium fluoride alone as an additive brings about good results only when the molar ratio of $TiO_2$ to $BaO_2$ in barium titanate is 0.97 to 0.98. In the case of ordinary barium titanate in which the molar ratio is about 1, the insulation resistance and the relative permittivity are low, so that no good result can be obtained. And lithium fluoride systems comprising the combination of lithium oxide and zinc fluoride or cupric fluoride also has the same disadvantages as described above.

That is to say, in prior art, there is strongly desired an advent of a highly reliable dielectric ceramic composition which has high relative permittivity, a high insulation resistance, a small dielectric loss and fine and uniform grains, can be sintered at a low temperature, and permits stable production of a sintered body.

SUMMARY OF THE INVENTION

Accordingly, an object of this invention is to provide a high reliable dielectric ceramic composition which have a high relative permittivity, a high insulation resistance and a small dielectric loss, has fine and uniform grain size, and permits stable production of a sintered body by sintering at a low temperature.

Another object of this invention is to provide a process for producing a dielectric ceramic composition having fine and uniform grain size, a high relative permittivity, a high insulation resistance and the like, which comprises sintering a composition comprising barium titanate as its main constituent and copper oxide, other metal oxides and the like at a low temperature.

Further another object of this invention is to provide a dielectric ceramic composition having a high relative permittivity, a high insulation resistance and a small dielectric loss, particularly a ceramic product useful as a capacitor.

Further objects of this invention will become apparent from the description of the invention which follows.

The present inventors have conducted various researches and have consequently found that a dielectric substance free from the above-mentioned disadvantages can be obtained by combining barium titanate with specific amounts of copper oxide and at least one oxide selected from the group consisting of lithium oxide, zinc oxide, cadmium oxide and iron oxide, and if necessary, at least one complex oxide selected from the group consisting of lead titanate, strontium titanate, calcium titanate, magnesium titanate, barium zirconate, calcium zirconate, strontium zirconate, lead zirconate, magnesium zirconate, lead stannate, calcium stannate, strontium stannate, barium stannate and magnesium stannate, whereby this invention has been accomplished.

That is to say, this invention relates to a dielectric ceramic composition comprising 87.5 to 99.6 mole % of barium titanate as a first component, 0.2 to 7.0 mole % of copper oxide as a second component, 0.2 to 5.5 mole % of at least one oxide selected from the group consisting of lithium oxide, zinc oxide, cadmium oxide and iron oxide as a third component, and if necessary, at least one complex oxide selected from the group consisting of lead titanate, strontium titanate, calcium titanate, magnesium titanate, barium zirconate, calcium zirconate, strontium zirconate, lead zirconate, magnesium zirconate, lead stannate, calcium stannate, strontium stannate, barium stannate and magnesium stannate as a fourth component in an amount of 0.3 to 40.0 moles per 100 moles of the sum of the first, second and third components; and a process for producing a dielectric ceramic composition which comprises sintering at a temperature of 1,000° to 1,200° C. a mixture comprising 87.5 to 99.6 mole % of barium titanate as a first component, 0.2 to 7.0 mole % of copper oxide as a second component, 0.2 to 5.5 mole % of at least one oxide selected from the group consisting of lithium oxide, zinc oxide, cadmium oxide and iron oxide as a third component, and if necessary, at least one complex oxide selected from the group consisting of lead titanate, strontium titanate, calcium titanate, magnesium titanate, barium zirconate, calcium zirconate, strontium zirconate, lead zirconate, magnesium zirconate, lead stannate, calcium stannate, strontium stannate, barium stannate and magnesium stannate as a fourth component in an amount of 0.3 to 40.0 moles per 100 moles of the sum of the first, second and third components.

DESCRIPTION OF THE PREFERRED EMBODIMENTS

By sintering at 1,000° to 1,200° C. a mixture of barium titanate and specific amounts of copper oxide and at least one oxide selected from the group consisting of lithium oxide, zinc oxide, cadmium oxide and iron oxide, there can be obtained a dielectric ceramic composition having a smaller tan $\delta$ value, a smaller and more uniform grain size and a higher insulation resistance than when copper oxide, lithium zinc oxide or cadmium oxide is used alone.

When copper oxide, and iron oxide are combined the temperature dependence of relative permittivity becomes very small and grain growth hardly occurs at the time of sintering so that there is obtained a dielectric ceramic composition composed of grains having a size which is substantially the same as or a little larger than the grain size of barium titanate powder used.

When the sintering temperature is lower than 1,000° C., a dense sintered body is difficult to obtain. When it exceeds 1,200° C., grain growth tends to be caused, the grain size is apt to be enlarged, and the value of tan $\delta$ tends to be increased.

Further, incorporation of a specific amount of at least one compound selected from the specific complex oxides as a fourth component permit increase of the value of relative permittivity, improvement of the temperature dependence, and further decrease of the grain size, without deteriorating the characteristics described above.

That is to say, when the fourth component is added to the combination of copper oxide and iron oxide, the value of relative permittivity is increased by 100 to 200, and further improvement of the temperature dependence becomes possible.

When the fourth component is added to the combination of copper oxide and zinc oxide and/or cadmium oxide, the value of relative permittivity near room temperature can be increased to 10,000 or more. Zinc oxide is superior to cadmium oxide in effect of exhibitting these characteristics, has low toxicity, and hence is preferred.

When the fourth component is added to the combination of copper oxide and lithium oxide, the value of tan $\delta$ and the grain size becomes a little larger than when the zinc oxide-containing system is used, but the value of relative permittivity near room temperature can be increased to as large as 18,000 or more.

Barium titanate used in this invention may be produced by any of a solid phase method, liquid phase method, oxalate method, alkoxide method and the like.

When barium titanate having an average grain size of as small as 1μ or less, preferably 0.5μ or less and a uniform grain size distribution is used, a sintered body having a more uniform microstructure can be obtained, the insulation resistance is increased, and uniformity of various characteristics is increased.

In this invention, the oxides can be used as they are as copper oxide, lithium oxide, zinc oxide, cadmium oxide and iron oxide. Any of inorganic compounds such as hydroxides, carbonates and the like and organic compounds such as oxalates, alkoxides and the like can be used so long as it decomposes below the sintering temperature to form said oxide. As copper oxide, any of cuprous oxide, cupric oxide and a mixture of them can be used. As iron oxide, any of ferrous oxide, ferric oxide and a mixture of them can be used.

In this invention, as lead titanate, strontium titanate, calcium titanate, magnesium titanate, barium zirconate, calcium zirconate, strontium zirconate, lead zirconate, magnesium zirconate, lead stannate, calcium stannate, strontium stannate, barium stannate and magnesium stannate, there are suitably used those having ordinary complex oxide forms, i.e., $PbTiO_3$, $SrTiO_3$, $CaTiO_3$, $MgTiO_3$, $BaZrO_3$, $CaZrO_3$, $SrZrO_3$, $PbZrO_3$, $MgZrO_3$, $PbSnO_3$, $CaSnO_3$, $SrSnO_3$, $BaSnO_3$ and $MgSnO_3$, respectively.

The proportion of barium titanate in the ceramic composition of this invention ranges from 87.5 to 99.6 mole %. When the proportion is more than 99.6 mole %, the resulting composition is difficult to sinter at a temperature of 1,200° C. or lower, while when it is less than 87.5 mole %, serious deformation of a green body occurs at the time of sintering.

The proportion of copper oxide ranges from 0.2 to 7.0 mole % in terms of CuO. When it is more than 7.0 mole %, deformation of a green body becomes serious and the value of tan δ is increased. Moreover, the grain size of sintered body becomes uneven and large. When the proportion is less than 0.2 mole %, sintering at a low temperature becomes impossible.

The proportion of at least one oxide selected from the group consisting of lithium oxide, zinc oxide, cadmium oxide and iron oxide range from 0.2 to 5.5 mole % in terms of $Li_2O$, ZnO, CdO and $Fe_2O_3$, respectively. When the proportion of lithium oxide is more than 5.5 mole %, deformation of a green body becomes serious, the value of dielectric loss is increased, and the value of insulation resistance is decreased. Moreover, the grain size of sintered body becomes uneven and large. When the total proportion of zinc oxide, cadmium oxide and iron oxide is more than 5.5 mole %, sintering at a temperature of 1,200° C. or lower becomes difficult and the value of insulation resistance is decreased. When the total proportion of lithium oxide, zinc oxide, cadmium oxide and iron oxide is less than 0.2 mole %, their addition is hardly effective.

Further, good results such as large insulation resistance and small dielectric loss can be obtained when the molar ratio of the second component to the third component is adjusted to 1:3 to 3:1.

The fourth component is, if necessary, added in a proportion of 0.3 to 40.0 moles per 100 moles of the sum of the first, second and third components. When its amount exceeds 40.0 moles, the value of relative permittivity is decreased and the value of insulation resistance tends to be decreased. When the amount is less than 0.3 mole, the addition is hardly effective.

In the case of the third component being lithium oxide, when the proportions of the first, second and third components are adjusted to 89.0 to 99.6 mole %, 0.2 to 5.5 mole % and 0.2 to 5.5 mole %, respectively, the sinterability is good and deformation of a green body hardly occurs. Therefore, it is more preferable. A composition comprising 92.5 to 99.4 mole % of first component, 0.3 to 4.0 mole % of the second component, and 0.3 to 3.5 mole % of the third component gives a uniform grain size of sintered body, a very small dielectric loss and a sufficiently high insulation resistance, and hence is most preferable. In a more preferable embodiment, the fourth component is added in an amount of 2.5 to 40.0 moles, most preferably 5.0 to 25.0 moles per 100 moles of the sum of the first, second and third components. When the amount is less than 2.5 moles, the effect of the addition is not very remarkable, the grain size is not reduced, and the value of relative permittivity is not greatly increased. Also when it exceeds 40.0 moles, the value of relaive permittivity is decreased and the value of insulation resistance tends to be decreased. When it is in the range of 5.0 to 25.0 mole %, a composition having an especially high relative permittivity can be obtained. When barium stannate, calcium stannate or a mixture of them is used, it becomes easy to obtain a composition having a high relative permittivity.

In the case of the third component being zinc oxide and/or cadmium oxide, when the proportions of the first, second and third components are adjusted to 92.5 to 99.4 mole %, 0.3 to 4.0 mole % and 0.3 to 3.5 mole %, respectively, the sinterability is good, deformation of a green body hardly occurs, and there can be obtained a composition having a sufficiently high insulation resistance, a very small dielectric loss and a uniform grain size. Therefore, it is more preferable. Further, in a more preferable embodiment, the fourth component is added in an amount of 2.5 to 40.0 moles, most preferably 5.0 to 25.0 moles per 100 moles of the sum of the first, second and third components. When the amount is less than 2.5 moles, the effect of the addition is not very remarkable, the grain size is not reduced so much, and the value of relative permittivity is not greatly increased. Also when it exceeds 40.0 mole %, the value of relative permittivity is decreased and the value of insulation resistance tends to be decreased. When it is in the range of 5.0 to 25.0 mole %, a composition having an especially high relative permittivity can be obtained. When barium stannate, calcium stannate or a mixture of them is used, it becomes easy to obtain a composition having a high relative permittivity.

In the case of the third component being iron oxide, when the proportions of the first, second and third components are adjusted to 90.0 to 99.6 mole %, 0.2 to 5.0 mole % and 0.2 to 5.0 mole %, respectively, the sinterability is good and deformation of a green body hardly occurs. Therefore, it is more preferable. When the proportions of the first, second and third components are 92.5 to 99.4 mole %, 0.3 to 4.0 mole % and 0.3 to 3.5 mole %, respectively, the temperature characteristic of the relative permittivity becomes small, the dielectric loss becomes very small, and the grain size becomes uniform. Therefore, it is most preferable. Further, in a more preferable embodiment, the fourth component is added in an amount of 0.3 to 30.0 moles, most preferably 0.5 to 25.0 moles per 100 moles of the sum of the first, second and third components. When the amount is less than 0.3 mole, the effect of the addition is not very remarkable, the value of relative permittivity is not greatly increased and its temperature dependence is not markedly improved. Also when the amount exceeds 30.0 moles, the value of relative permittivity is decreased and its temperature dependence is increased. When the amount is in the range of 0.5 to 25.0 mole %, a composition having an especially high relative permittivity can be obtained and the temperature dependence is also good.

When lead zirconate, calcium zirconate or a mixture of them is used, the temperature dependence of the relative permittivity is most improved. Therefore, it is preferable.

This invention is illustrated in detail by way of the following Examples.

TABLE 1

| Sample No. | Composition (mole %) | | | Sintering conditions temp. (°C.) × time (hr) |
|---|---|---|---|---|
| | $BaTiO_3$ | CuO | $Li_2O$ | |
| 1 | 98.4 | 1.6 | 0 | 1150 × 3 |
| 2 | 98.4 | 0 | 1.6 | 1150 × 3 |
| 3 | 97.1 | 1.5 | 1.4 | 1125 × 4 |
| 4 | 99.8 | 0.1 | 0.1 | 1125 × 3 |
| 5 | 98.2 | 0.4 | 1.4 | 1125 × 3 |
| 6 | 90.0 | 4.3 | 5.7 | 1150 × 2 |
| 7 | 89.0 | 6.0 | 5.0 | 1150 × 3 |
| 8 | 99.0 | 0.5 | 0.5 | 1125 × 3 |
| 9 | 98.0 | 1.5 | 0.5 | " |
| 10 | 98.0 | 0.5 | 1.5 | " |
| 11 | 94.0 | 3.0 | 3.0 | " |

TABLE 2

| Sample No. | Relative permittivity ($\epsilon$) | | tan δ (%) | IR (MΩ) | Sintered density (g/cm$^3$) | Grain size (μm) | Abnormal grain growth | Deformation of sintered body |
|---|---|---|---|---|---|---|---|---|
| | Value at 20° C. | Maximum* value | | | | | | |
| 1 | 1710 | 18000 | 3.5 | 4 × 10$^4$ | 5.6 | ~50 | Occurred | None |
| 2 | 1400 | 9200 | 1.7 | 3 × 10$^4$ | 5.0 | ~25 | None | Occurred |
| 3 | 1780 | 21000 | 1.5 | 4 × 10$^5$ | 5.7 | ~7 | " | None |
| 4 | Measurement was impossible because of a large porosity. | | | | | " | " | " |
| 5 | 1730 | 17000 | 1.2 | 5 × 10$^5$ | 5.8 | ~8 | " | Occurred |
| 6 | Measurement was impossible because of a large porosity. | | | | | " | " | None |
| 7 | Measurement was impossible because of a large porosity. | | | | | " | Occurred | " |
| 8 | 1720 | 16000 | 1.0 | 7 × 10$^5$ | 5.8 | ~6 | None | " |
| 9 | 1730 | 19000 | 0.9 | 8 × 10$^4$ | 5.7 | ~7 | None | None |
| 10 | 1710 | 16000 | 1.0 | 7 × 10$^4$ | 5.7 | ~7 | " | " |
| 11 | 1780 | 17000 | 0.8 | 6 × 10$^5$ | 5.8 | ~8 | " | " |

*Maximum value: Maximum value in the temperature range of 20° C. to 140° C.

EXAMPLE 1

Barium titanate, lithium oxide and cupric oxide were weighed out in the proportions shown in Table 1, and mixed with pure water by using a nylon pot and nylon balls. The average particle size of the barium titanate measured from scanning electron micrograph was about 0.25μ. The resulting mixture was dried, after which a suitable amount of polyvinyl alcohol was added as a binder, and the mixture thus obtained was granulated, dried, and then formed into green disk having a diameter of 15 mm and a thickness of 0.6 mm at a pressure of 2t/cm$^2$. Next, five of the green disk were placed one upon another on a setter made of zirconia, and sintered under the sintering conditions shown in Table 1. Silver electrodes of 10 mmφ were attached to both sides of the sintered disk, and various characteristics of the disk were measured. The relative permittivity and the dielectric loss (tan δ) were measured by means of an LCR meter under the conditions of 1 KHz, 1 V and 20° C. The insulation resistance was measured by means of a high insulation resistance meter by applying a voltage of 500 V. Further, the surface of the sintered disk was photographed through a scanning electron microscope and the grain size was measured. The sintered density was calculated by dividing the weight of the disk by its volume measured by means of a micrometer. The evaluation results are shown in Table 2. Samples Nos. 1, 2, 4, 6 and 7 are outside the scope of this invention.

As is evident from Table 2, the samples within the scope of this invention have a very uniform grain size of less than 10 μm and are excellent in electrical characteristics such as tan δ and IR. Moreover, they show no deformation of the sintered body.

EXAMPLE 2

Barium titanate, zinc oxide, cadmium oxide and cupric oxide were weighed out in the proportions shown in Table 3, and a green disk was produced in the same manner as in Example 1 and its various characteristics were measured. The evaluation results are shown in Table 4. Samples Nos. 1, 4, 6 and 7 are outside the scope of this invention, and Samples Nos. 2, 3 and 5 are within the scope of this invention. It can be seen that, as is evident from Table 4, the samples within the scope of this invention have a small tan δ, a high insulation resistance, a high sintered density, and a small grain size.

TABLE 3

| Sample No. | Composition (mole %) | | | | Sintering conditions temp. (°C.) × time (hr) |
|---|---|---|---|---|---|
| | $BaTiO_3$ | ZnO | CuO | CdO | |
| 1 | 98.6 | 0 | 1.4 | 0 | 1150 × 3 |
| 2 | 97.2 | 1.4 | 1.4 | 0 | 1125 × 3 |
| 3 | 97.2 | 0 | 1.4 | 1.4 | 1150 × 2 |
| 4 | 99.8 | 0.1 | 0.1 | 0 | 1125 × 3 |
| 5 | 98.1 | 0.4 | 1.5 | 0 | 1150 × 1 |
| 6 | 89.0 | 3.5 | 7.5 | 0 | 1150 × 1 |
| 7 | 87.0 | 7.4 | 5.6 | 0 | 1250 × 1 |

TABLE 4

| Sample No. | Electrical characteristics | | | Sintered density (g/cm$^3$) | Grain size (μ) |
|---|---|---|---|---|---|
| | Relative permittivity ($\epsilon$) | tan δ (%) | Insulation resistance (MΩ) | | |
| 1 | 1720 | 3.5 | 4.0 × 10$^4$ | 5.0 | ~30 |
| 2 | 1740 | 0.6 | 4.0 × 10$^5$ | 5.5 | ~7 |
| 3 | 1700 | 1.1 | 1.5 × 10$^5$ | 5.4 | ~10 |
| 4 | 1620 | 1.2 | 5 × 10$^3$ | 4.8 | — |
| 5 | 1850 | 1.6 | 1.0 × 10$^5$ | 5.5 | ~10 |
| 6 | Deformation and fusion of a sintered body occurred. | | | | |

TABLE 4-continued

| | Electrical characteristics | | | | |
|---|---|---|---|---|---|
| Sample No. | Relative permittivity ($\epsilon$) | tan $\delta$ (%) | Insulation resistance (M $\Omega$) | Sintered density (g/cm³) | Grain size ($\mu$) |
| 7 | 1820 | 1.5 | $7.0 \times 10^4$ | 5.3 | ~20 |

EXAMPLE 3

Barium titanate, ferric oxide and cupric oxide were weighed out in the proportions shown in Table 5, and a green disk was produced in the same manner as in Example 1 and its characteristics were evaluated. From a scanning electron micrograph of the surface of the sintered disk, the average grain size was determined by a line intercept method. The evaluation results are shown in Table 6. Samples Nos. 1, 2, 3 and 15 are outside the scope of this invention. As is evident from Table 6, the samples within the scope of this invention have a high relative permittivity, small temperature dependence, fine grain size, low tan $\delta$, and high IR and the like.

TABLE 5

| Sample No. | Composition (mole %) | | | Sintering conditions temp. (°C.) × time (hr) |
|---|---|---|---|---|
| | BaTiO₃ | CuO | Fe₂O₃ | |
| 1 | 99.8 | 0.1 | 0.1 | 1125 × 3 |
| 2 | 98.9 | 1.0 | 0.1 | " |
| 3 | 98.9 | 0.1 | 1.0 | " |
| 4 | 98.6 | 0.5 | 0.9 | " |
| 5 | 98.2 | 0.9 | 0.9 | " |
| 6 | 97.7 | 0.9 | 1.4 | " |
| 7 | 96.4 | 0.9 | 2.7 | 1125 × 2 |
| 8 | 97.3 | 1.8 | 0.9 | " |
| 9 | 96.8 | 1.8 | 1.4 | " |
| 10 | 96.8 | 2.5 | 0.7 | " |
| 11 | 96.8 | 0.7 | 2.5 | " |
| 12 | 95.3 | 3.2 | 1.5 | " |
| 13 | 90.0 | 5.0 | 5.0 | " |
| 14 | 92.0 | 3.0 | 5.0 | " |
| 15 | 89.0 | 7.0 | 4.0 | " |

TABLE 6

| Sample No. | Relative permittivity ($\epsilon$) | tan $\delta$ (%) | IR (M $\Omega$) | Rate of change*¹ with temp. of $\epsilon$ (%) | | Maximum rate*² of change of $\epsilon$ (%) | Sintered density (g/cm³) | grain size ($\mu$m) |
|---|---|---|---|---|---|---|---|---|
| | | | | −30° C. | +85° C. | | | |
| 1 | Measurement was impossible because of a large porosity. | | | | | | 4.8 | 0.25 |
| 2 | 2100 | 2.0 | $2 \times 10^3$ | −30 | +63 | 63 | 5.1 | 5.0 |
| 3 | Measurement was impossible because of a large porosity. | | | | | | 4.8 | 0.25 |
| 4 | 1420 | 1.0 | $3 \times 10^4$ | −10 | +5 | 6 | 5.4 | 0.25 |
| 5 | 1680 | 0.7 | $1 \times 10^5$ | −8 | +4 | 5 | 5.7 | 0.50 |
| 6 | 1790 | 0.9 | $2 \times 10^5$ | −8 | +5 | 6 | 5.5 | 0.25 |
| 7 | 1630 | 1.0 | $1 \times 10^5$ | −8 | +5 | 6 | 5.4 | 0.25 |
| 8 | 1790 | 1.1 | $4 \times 10^5$ | −8 | +5 | 5 | 5.7 | 0.50 |
| 9 | 1780 | 0.9 | $6 \times 10^5$ | −9 | +2 | 5 | 5.8 | 0.25 |
| 10 | 1730 | 1.3 | $5 \times 10^5$ | −10 | +1 | 3 | 5.7 | 1.0 |
| 11 | 1790 | 0.9 | $1 \times 10^4$ | −9 | +4 | 6 | 5.3 | 0.25 |
| 12 | 1760 | 1.2 | $1 \times 10^4$ | −10 | +5 | 6 | 5.7 | 0.50 |
| 13 | 1780 | 1.4 | $1 \times 10^5$ | −13 | +1 | 3 | 5.3 | 0.50 |
| 14 | 1770 | 1.4 | $3 \times 10^5$ | −15 | −1 | 2 | 5.7 | 1.0 |
| 15 | Measurement was impossible because of adhesion of sintered disks. | | | | | | | |

*¹With respect to the reference $\epsilon$ value at 20° C.
*²In the temperature range of −30° C. to +185° C.

EXAMPLE 4

Barium stannate and calcium stannate were added as fourth components to a composition consisting of barium titanate, cupric oxide, zinc oxide and cadmium oxide.

The various compounds were weighed out in the proportions shown in Table 7, and green disk was produced in the same manner as in Example 1 and sintered under the sintering conditions shown in Table 7. Silver electrodes were attached to the sintered disk in the same manner as in Example 3, and various characteristics were measured.

The evaluation results are shown in Table 8. Samples Nos. 2 and 4 are outside the scope of this invention. Samples Nos. 7 and 9 contain the fourth component in an amount within the scope of this invention but are outside the scope of preferred embodiments of this invention. It can be seen that, as is evident from Table 8, addition of barium stannate and calcium stannate makes it possible to increase the relative permittivity at 20° C. to 10,000 or more while keeping the tan $\delta$ small and the insulation resistance high, and to reduce the grain size.

TABLE 7

| Sample No. | Composition (mole*) | | | | | | Sintering conditions temp. (°C.) × time (hr) |
|---|---|---|---|---|---|---|---|
| | BaTiO₃ | ZnO | CuO | CdO | BaSnO₃ | CaSnO₃ | |
| 1 | 97.6 | 1.1 | 1.3 | 0 | 4.8 | 8.6 | 1125 × 3 |
| 2 | 98.6 | 0 | 1.4 | 0 | 4.7 | 7.9 | 1150 × 2 |
| 3 | 95.9 | 0 | 0.7 | 3.4 | 4.8 | 8.6 | 1150 × 3 |
| 4 | 96.6 | 0 | 3.4 | 0 | 4.7 | 7.9 | 1190 × 2 |
| 5 | 96.1 | 2.2 | 1.7 | 0 | 4.5 | 7.7 | 1125 × 2 |
| 6 | 95.2 | 1.5 | 3.3 | 0 | 4.7 | 8.0 | 1150 × 1 |
| 7 | 98.6 | 0.7 | 0.7 | 0 | 1.5 | 0 | 1150 × 1.5 |
| 8 | 97.3 | 1.4 | 1.3 | 0 | 4.8 | 8.6 | 1125 × 2 |
| 9 | 93.4 | 2.1 | 4.5 | 0 | 46.2 | 7.7 | 1125 × 6 |
| 10 | 96.7 | 1.6 | 1.7 | 0 | 11.4 | 3.7 | 1150 × 2 |
| 11 | 96.8 | 1.5 | 1.7 | 0 | 4.7 | 8.0 | 1090 × 5 |

TABLE 7-continued

| Sample No. | Composition (mole*) | | | | | | Sintering conditions temp. (°C.) × time (hr) |
|---|---|---|---|---|---|---|---|
| | BaTiO$_3$ | ZnO | CuO | CdO | BaSnO$_3$ | CaSnO$_3$ | |
| 12 | 95.6 | 1.4 | 3.0 | 0 | 6.7 | 5.6 | 1250 × 1 |
| 13 | 96.6 | 1.4 | 2.0 | 0 | 5.1 | 7.3 | 975 × 14 |

*The numbers of moles of BaSnO$_3$ and CaSnO$_3$ are shown by taking the total amount of BaTiO$_3$ + ZnO + CuO + CdO as 100 moles.

TABLE 8

| Sample No. | Electrical characteristics | | | Sintered density (g/cm$^3$) | Average grain size (μ) |
|---|---|---|---|---|---|
| | Relative permittivity (ε) | tan δ (%) | Insulation resistance (M Ω) | | |
| 1 | 7200 | 0.9 | 2.0 × 10$^5$ | 5.6 | 2.2 |
| 2 | 7700 | 3.2 | 8.0 × 10$^3$ | 5.1 | 5.1 |
| 3 | 3500 | 1.3 | 1.0 × 10$^5$ | 5.5 | 2.3 |
| 4 | 3600 | 3.5 | 3.1 × 10$^3$ | 5.2 | 6.5 |
| 5 | 4600 | 0.7 | 4.2 × 10$^5$ | 5.7 | 1.2 |
| 6 | 4600 | 0.5 | 2.2 × 10$^5$ | 5.7 | 1.5 |
| 7 | 1900 | 0.7 | 2.0 × 10$^5$ | 5.6 | 6.8 |
| 8 | 11000 | 0.8 | 2.2 × 10$^5$ | 5.8 | 2.9 |
| 9 | 2000 | 1.3 | 3.0 × 10$^4$ | — | — |
| 10 | 5500 | 1.0 | 3.3 × 10$^5$ | 5.8 | 2.1 |
| 11 | 5200 | 0.9 | 1.2 × 10$^5$ | 5.5 | 1.5 |
| 12 | 5100 | 1.8 | 6.0 × 10$^4$ | 5.4 | 4.5 |
| 13 | — | — | — | 4.4 | — |

EXAMPLE 5

The ingredients shown in Table 9 were weighed out in the proportions shown therein, and mixed with alcohol by means of a nylon ball mill. The resulting mixture was dried and then passed through a 100-mesh screen, and a paste was prepared from the passed particles by means of a ball mill having agate balls by using acrylic resin as a binder and trichloroethane as a solvent. Disks having a diameter of 12 mm and a thickness of 0.4 mm were formed by using the paste obtained, and sintered under the sintering conditions shown in Table 9. Silver electrodes having a diameter of 8 mm were attached to the sintered disk, and characteristics of the disk were evaluated in the same manner as in Example 3. The results obtained are shown in Table 10. It can be seen that a dielectric substance having satisfactory characteristics was obtained also in this Example.

TABLE 9

| Sample No. | Composition (mole*) | | | | | Sintering conditions temp. (°C.) × time (hr) |
|---|---|---|---|---|---|---|
| | BaTiO$_3$ | ZnO | CuO | Fourth component | | |
| 1 | 95.0 | 1.6 | 3.4 | BaSnO$_3$ 4.7 | BaZrO$_3$ 8.0 | 1125 × 3 |
| 2 | 97.6 | 0.8 | 1.6 | BaSnO$_3$ 4.7 | CaSnO$_3$ 8.0 | 1130 × 2 |
| 3 | 96.8 | 1.6 | 1.6 | CaSnO$_3$ 12.7 | — | 1140 × 1 |
| 4 | 96.8 | 1.6 | 1.6 | BaSnO$_3$ 4.7 | CaZrO$_3$ 8.0 | 1150 × 3 |
| 5 | 95.0 | 1.6 | 3.4 | BaSnO$_3$ 4.7 | PbTiO$_3$ 8.0 | 1125 × 3 |

*The number of moles of the fourth component is shown by taking the total amount of BaTiO$_3$ + ZnO + CuO as 100 moles.

TABLE 10

| Sample No. | Electrical characteristics | | | Sintered density (g/cm$^3$) | Average grain size (μ) |
|---|---|---|---|---|---|
| | Relative permittivity (ε) | tan δ (%) | Insulation resistance (M Ω) | | |
| 1 | 4300 | 1.0 | 3.0 × 10$^5$ | 5.9 | 1.6 |
| 2 | 8000 | 1.1 | 2.0 × 10$^5$ | 5.7 | 3.0 |
| 3 | 6100 | 1.0 | 3.3 × 10$^5$ | 5.5 | 2.0 |
| 4 | 4000 | 1.2 | 2.5 × 10$^5$ | 5.8 | 1.7 |
| 5 | 2900 | 1.3 | 2.0 × 10$^5$ | 5.9 | 1.1 |

EXAMPLE 6

Barium titanate, cupric oxide and lithium oxide were weighed out in the proportions shown in Table 11, and barium stannate and calcium stannate were added in the proportions per 100 moles of the sum of these compounds shown in Table 11. In the same manner as in Example 1, disks were produced and sintered. Silver electrodes were attached to both side of the sintered disk, and various electrical characteristics of the disk were evaluated. The evaluation results are shown in Table 12. Sample No. 8 is outside the scope of this invention.

It can be seen that as is evident from Table 12, the sintered body containing complex oxides such as calcium stannate and barium stannate have a very high relative permittivity near room temperature and are excellent in electrical characteristics such as tan δ and IR. Further, observation by a scanning electron microscope indicated that the surfaces of the sintered body were composed of uniform grains of 5 to 7 μm, and no deformation of the samples was observed.

TABLE 11

| Sample No. | Composition (mole*) | | | | | Sintering conditions temp. (°C.) × time (hr) |
|---|---|---|---|---|---|---|
| | BaTiO$_3$ | CuO | Li$_2$O | BaSnO$_3$ | CaSnO$_3$ | |
| 1 | 98.1 | 0.7 | 1.2 | 4.8 | 8.7 | 1125 × 3 |
| 2 | 97.8 | 1.0 | 1.2 | 4.8 | 8.7 | 1125 × 3 |
| 3 | 97.4 | 1.4 | 1.2 | 4.8 | 8.7 | 1125 × 3 |
| 4 | 97.0 | 1.8 | 1.2 | 4.8 | 8.7 | 1125 × 3 |
| 5 | 96.6 | 2.2 | 1.2 | 4.8 | 8.7 | 1125 × 3 |
| 6 | 97.8 | 1.4 | 0.8 | 4.8 | 8.7 | 1055 × 3 |
| 7 | 98.0 | 1.4 | 0.6 | 4.8 | 8.7 | 1125 × 6 |
| 8 | 98.6 | 1.4 | 0 | 4.8 | 8.7 | 1125 × 6 |
| 9 | 97.4 | 1.4 | 1.2 | 3.2 | 13.1 | 1125 × 3 |
| 10 | 97.4 | 1.4 | 1.2 | 7.1 | 5.8 | 1055 × 3 |
| 11 | 97.4 | 1.4 | 1.2 | 9.5 | 0 | 1125 × 3 |

TABLE 11-continued

| Sample No. | Composition (mole*) | | | | | Sintering conditions temp. (°C.) × time (hr) |
|---|---|---|---|---|---|---|
| | BaTiO$_3$ | CuO | Li$_2$O | BaSnO$_3$ | CaSnO$_3$ | |
| 12 | 97.4 | 1.4 | 1.2 | 0 | 17.5 | 1125 × 3 |

*The number of moles of the fourth component is shown by taking the total amount of BaTiO$_3$ + CuO + Li$_2$O as 100 moles.

TABLE 12

| Sample No. | Relative permittivity | | Tan δ (%) | IR (MΩ) | Sintered density (g/cm$^3$) | Grain size (μm) | Abnormal grain growth | Deformation of sintered body |
|---|---|---|---|---|---|---|---|---|
| | Value at 20° C. | Maximum value | | | | | | |
| 1 | 15200 | 18000 | 0.9 | 2 × 10$^5$ | 5.6 | 5.6 | None | None |
| 2 | 18500 | 20600 | 1.0 | 3 × 10$^5$ | 5.8 | 5.6 | " | " |
| 3 | 23500 | 23600 | 2.1 | 2 × 10$^5$ | 5.9 | 5.5 | " | " |
| 4 | 18800 | 19800 | 1.5 | 2 × 10$^5$ | 5.9 | 7.3 | " | " |
| 5 | 17200 | 17500 | 2.2 | 2 × 10$^5$ | 5.8 | 6.4 | " | " |
| 6 | 11200 | 11600 | 0.9 | 2 × 10$^5$ | 5.7 | 2.2 | " | " |
| 7 | 13000 | 13800 | 3.0 | 1 × 10$^5$ | 5.9 | 3.0 | " | " |
| 8 | 11000 | 11200 | 3.0 | 2 × 10$^5$ | 5.7 | ~30 | Occurred | " |
| 9 | 17000 | 20900 | 1.3 | 4 × 10$^5$ | 5.9 | 6.9 | None | " |
| 10 | 16100 | 18000 | 1.5 | 1 × 10$^5$ | 5.5 | 5.3 | " | " |
| 11 | 13800 | 18200 | 3.5 | 2 × 10$^5$ | 5.7 | 5.8 | " | " |
| 12 | 17900 | 18100 | 0.9 | 3 × 10$^5$ | 5.8 | 5.8 | " | " |

EXAMPLE 7

Each of the complex oxides shown in Table 13 was added to a main ingredients composition consisting of 98.3 mole % of barium titanate, 0.7 mole % of cupric oxide and 1.0 mole % of ferric oxide, in the amount which is shown in Table 13 by taking the amount of the aforesaid composition as 100. In the same manner as in Example 5, disks having a diameter of 12 mm and a thickness of 0.4 mm were produced and then sintered at 1,125° C. for 4 hours. Next, silver electrodes were attached to the sintered product, and various electrical characteristics of the sintered product were evaluated in the same manner as in Example 3. The results obtained are shown in Table 14.

All of the sintered body obtained had a high sintered density, were sufficiently dense, and showed no deformation. From observation by a scanning electron microscope, it was found that the surfaces of the sintered body were composed of uniform and fine grains. The electrical characteristics such as tan δ and IR were satisfactory, and the rate of change with temperature of relative permittivity is very low even in a relatively wide temperature range of −55° C. to +125° C.

TABLE 13

| Sample No. | Complex oxide | Adding amount (mole %) |
|---|---|---|
| 1 | SrTiO$_3$ | 10 |
| 2 | PbTiO$_3$ | 7 |
| 3 | CaZrO$_3$ | 10 |
| 4 | PbZrO$_3$ | 6 |
| 5 | CaSnO$_3$ | 8 |
| 6 | PbSnO$_3$ | 5 |

TABLE 14

| Sample No. | Relative permittivity (ε) | tan δ (%) | IR (MΩ) | Rate of change*1 with temp. of ε | | Maximum*2 rate of change of ε (%) | Sintered density (g/cm$^3$) | Grain size (μm) |
|---|---|---|---|---|---|---|---|---|
| | | | | −55° C. | +125° C. | | | |
| 1 | 1840 | 0.8 | 9 × 10$^4$ | −14 | −17 | 2 | 5.5 | 0.25 |
| 2 | 1790 | 1.2 | 6 × 10$^4$ | −15 | +12 | 19 | 5.4 | 0.25 |
| 3 | 1780 | 0.6 | 3 × 10$^5$ | −15 | −20 | 4 | 5.5 | 0.25 |
| 4 | 1800 | 0.9 | 6 × 10$^5$ | −15 | −5 | 3 | 5.7 | 0.25 |
| 5 | 1800 | 1.1 | 8 × 10$^5$ | −15 | −12 | 0 | 5.6 | 0.25 |
| 6 | 1810 | 0.9 | 7 × 10$^5$ | −15 | −6 | 5 | 5.5 | 0.25 |

*1With respect to the reference ε value at 20° C.
*2In the temperature range of −55° C. to +125° C.

EXAMPLE 8

Two of the complex oxides shown in Table 15 were added to a main ingredients composition consisting of 98.3 mole % of barium titanate, 0.7 mole % of cupric oxide and 1.0 mole % of ferric oxide, in the amounts which are shown in Table 15 by taking the amount of the aforesaid composition as 100. In the same manner as in Example 5, disks were produced and then sintered at 1,125° C. for 4 hours. Then, silver electrodes were attached to the sintered disk, and electrical characteristics were evaluated. The results obtained are shown in Table 16.

As is evident from Table 16, combination of two of the complex oxides makes it possible to further reduce the rate of change with temperature of the relative permittivity while keeping the relative permittivity high.

TABLE 15

| Sample No. | Complex oxide (moles) | | |
|---|---|---|---|
| | PbZrO$_3$ | CaSnO$_3$ | CaZrO$_3$ |
| 1 | 6 | 8 | |
| 2 | 6 | 4 | |
| 3 | 3 | | 4 |

TABLE 15-continued

| Sample | Complex oxide (moles) | | |
|---|---|---|---|
| No. | PbZrO$_3$ | CaSnO$_3$ | CaZrO$_3$ |
| 4 | 6 | | 10 |
| 5 | 6 | | 5 |
| 6 | 3 | | 5 |

TABLE 16

| Sample No. | Relative permittivity ($\epsilon$) | tan δ (%) | IR (MΩ) | Rate of change*[1] with temp. of $\epsilon$ −55° C. | Rate of change*[1] with temp. of $\epsilon$ +125° C. | Maximum*[2] rate of change of $\epsilon$ (%) | Sintered density (g/cm$^3$) | Grain size (μm) |
|---|---|---|---|---|---|---|---|---|
| 1 | 1790 | 0.7 | 2 × 10$^6$ | −5 | −11 | 0 | 5.6 | 0.25 |
| 2 | 1850 | 0.8 | 2 × 10$^6$ | −11 | −5 | 1 | 5.6 | 0.25 |
| 3 | 1830 | 0.5 | 3 × 10$^6$ | −8 | −8 | 1 | 5.6 | 0.25 |
| 4 | 1800 | 0.7 | 2 × 10$^6$ | +5 | −15 | 6 | 5.6 | 0.25 |
| 5 | 1840 | 0.8 | 2 × 10$^6$ | −9 | −5 | 1 | 5.6 | 0.25 |
| 6 | 1910 | 0.7 | 2 × 10$^6$ | −8 | −8 | 0 | 5.6 | 0.25 |

*[1]With respect to the reference $\epsilon$ value at 20° C.
*[2]In the temperature range of −55° C. to +125° C.

What is claimed is:

1. A dielectric ceramic composition consisting essentially of 87.5 to 99.6 mole % of barium titanate as a first component, 0.2 to 7.0 mole % of copper oxide as a second component, and 0.2 to 5.5 mole % of at least one third component selected from the group consisting of lithium oxide, zinc oxide, cadmium oxide and iron oxide, with the proviso that the amounts of said first and second components are 89.0 mole % or more and 5.5 mole % or less respectively when said at least one third component is lithium oxide, and 90.0 mole % or more and 5.0 mole % or less respectively when said at least one third component is iron oxide.

2. The dielectric ceramic composition according to claim 1, wherein the amount of said first component is 92.5 to 99.4 mole %, the amount of said second component is 0.3 to 4.0 mole %, and the amount of said at least one third component is 0.3 to 3.5 mole %.

3. The dielectric ceramic composition according to claim 2, wherein the molar ratio of said second component to said at least one third component is 1:3 to 3:1.

4. The dielectric ceramic composition according to claim 3, wherein said at least one third component is a single oxide selected from the group consisting of lithium oxide, zinc oxide, cadmium oxide and iron oxide, or is a mixture of zinc oxide and cadmium oxide.

5. The dielectric ceramic composition according to claim 1, which further consists essentially of at least one fourth component complex oxide selected from the group consisting of the barium, calcium, strontium, lead and magnesium salts of titanic acid, zirconic acid and stannic acid other than barium titanate in an amount of not more than 40.0 moles and not less than 0.3 mole per 100 moles of the sum of said first, second and at least one third components, with the proviso that the amount of said at least one fourth component complex oxide is 2.5 moles or more when said at least one third component is lithium oxide, zinc oxide, cadmium oxide or a mixture of zinc oxide and cadmium oxide, and is 30 moles or less when said at least one third component is iron oxide.

6. The dielectric ceramic composition according to claim 5, wherein the number of moles of said at least one fourth component complex oxide is 0.5 to 25.0, with the proviso that said number of moles is at least 5.0 when said at least one third component is lithium oxide, zinc oxide, cadmium oxide or a mixture of zinc oxide and cadmium oxide.

7. The dielectric ceramic composition according to claim 6, wherein the amount of said first component is 92.5 to 99.4 mole %, the amount of said second component is 0.3 to 4.0 mole %, and the amount of said at least one third component is 0.3 to 3.5 mole %.

8. The dielectric ceramic composition according to claim 6, wherein the molar ratio of said second component to said at least one third component is 1:3 to 3:1.

9. The dielectric ceramic composition according to claim 7, wherein the molar ratio of said second component to said at least one third component is 1:3 to 3:1.

10. The dielectric ceramic composition according to claim 9, wherein said at least one fourth component complex oxide is barium stannate, calcium stannate or a mixture of these salts when said at least one third component is lithium oxide, zinc oxide, cadmium oxide or a mixture of zinc oxide and cadmium oxide; or wherein said at least one fourth component complex oxide is calcium zirconate, lead zirconate or a mixture of these salts when said at least one third component is iron oxide.

11. The dielectric ceramic composition according to claim 5, wherein said at least one fourth component complex oxide is barium stannate, calcium stannate or a mixture of these salts when said at least one third component is lithium oxide, zinc oxide, cadmium oxide or a mixture of zinc oxide and cadmium oxide; or wherein said at least one fourth component complex oxide is calcium zirconate, lead zirconate or a mixture of these salts when said at least one third component is iron oxide.

12. The dielectric ceramic composition according to claim 11, wherein the amount of said first component is 92.5 to 99.4 mole %, the amount of said second component is 0.3 to 4.0 mole %, and the total amount of said at least one third component is 0.3 to 3.5 mole %.

13. The dielectric ceramic composition according to claim 11, wherein the number of moles of said at least one fourth component complex oxide is 0.5 to 25.0, with the proviso that said number of moles is at least 5.0 when said at least one third component is lithium oxide, zinc oxide, cadmium oxide or a mixture of zinc oxide and cadmium oxide.

14. The dielectric ceramic composition according to claim 12, wherein the molar ratio of said second component to said at least one third component is 1:3 to 3:1.

15. A process for producing a dielectric ceramic composition consists essentially of 87.5 to 99.6 mole % of barium titanate as a first component, 0.2 to 7.0 mole % of copper oxide as a second component, and 0.2 to 5.5 mole % of at least one third component selected from the group consisting of lithium oxide, zinc oxide, cadmium oxide and iron oxide, the amounts of said first and second components being 89.0 mole % or more and 5.5 mole % or less respectively when said at least one third component is lithium oxide, and 90.0 mole % or more and 5.0 mole % or less respectively when said at least one third component is iron oxide, which process comprises sintering at a temperature of 1,000° to 1,200° C. a mixture comprising 87.5 to 99.6 mole % of barium titanate as a first component, 0.2 to 7.0 mole % of copper oxide as a second component, and 0.2 to 5.5 mole % of at least one third component selected from the group consisting of lithium oxide, zinc oxide, cadmium oxide and iron oxide; with the proviso that the amounts of said first and second components are 89.0 mole % or more and 5.5 mole % or less respectively when said at least one third component is lithium oxide, and 90.0 mole % or more and 5.0 mole % or less respectively when said at least one third component is iron oxide.

16. The process for producing a dielectric ceramic composition according to claim 15, wherein the amount of said first component is 92.5 to 99.4 mole %, the amount of said second component is 0.3 to 4.0 mole %, and the amount of said at least one third component is 0.3 to 3.5 mole %.

17. The process for producing a dielectric ceramic composition according to claim 16, wherein the molar ratio of said second component to said at least one third component is 1:3 to 3:1.

18. The process for producing a dielectric ceramic composition according to claim 17, wherein said at least one third component is lithium oxide, zinc oxide, cadmium oxide, iron oxide or a mixture of zinc oxide and cadmium oxide.

19. The process for producing a dielectric ceramic composition according to claim 15, wherein said mixture which is sintered further consists essentially of at least one fourth component complex oxide selected from the group consisting of the barium, calcium, strontium, lead and magnesium salts of titanic acid, zirconic acid and stannic acid other than barium titanate in an amount of not more than 40.0 moles and not less than 0.3 mole per 100 moles of the sum of said first, second and at least one third components, with the proviso that the amount of said at least one fourth component complex oxide is 2.5 moles or more when said at least one third component is lithium oxide, zinc oxide, cadmium oxide or a mixture of zinc oxide and cadmium oxide, and is 30.0 moles or less when said at least one third component is iron oxide; and the composition of the resulting sintered product is in accordance with said amounts.

20. The process for producing a dielectric ceramic composition according to claim 19, wherein the number of moles of said at least one fourth component complex oxide is 0.5 to 25.0, with the provisio that said number of moles is at least 5.0 when said at least one third component is lithium oxide, zinc oxide, cadmium oxide or a mixture of zinc oxide and cadmium oxide.

21. The process for producing a dielectric ceramic composition according to claim 20, wherein the amount of said first component is 92.5 to 99.4 mole %, the amount of said second component is 0.3 to 4.0 mole %, and the amount of said at least one third component is 0.3 to 3.5 mole %.

22. The process for producing a dielectric ceramic composition according to claim 20, wherein the molar ratio of said second component to said at least one third component is 1:3 to 3:1.

23. The process for producing a dielectric ceramic composition according to claim 21, wherein the molar ratio of said second component to said at least one third component is 1:3 to 3:1.

24. The process for producing a dielectric ceramic composition according to claim 23, wherein said at least one fourth component complex oxide is barium stannate, calcium stannate or a mixture of these salts when said at least one third component is lithium oxide, zinc oxide, cadmium oxide or a mixture of zinc oxide and cadmium oxide; or wherein sait at least one fourth component complex oxide is calcium zirconate, lead zirconate or a mixture of these salts when said third component is iron oxide.

25. The process for producing a dielectric ceramic composition according to claim 19, wherein said at least one fourth component complex oxide is barium stannate, calcium stannate or a mixture of these salts when said at least one third component is lithium oxide, zinc oxide, cadmium oxide or a mixture of zinc oxide and cadmium oxide; or wherein said at least one fourth component complex oxide is calcium zirconate, lead zirconate or a mixture of these salts when said third component is iron oxide.

26. The process for producing a dielectric ceramic composition according to claim 25, wherein the amount of said first component is 92.5 to 99.4 mole %, the amount of said second component is 0.3 to 4.0 mole %, and the amount of said at least one third component is 0.3 to 3.5 mole %.

27. The process for producing a dielectric ceramic composition according to claim 25, wherein the number of moles of said at least one fourth component complex oxide is 0.5 to 25.0, with the proviso that said number of moles is at least 5.0 when said at least one third component is lithium oxide, zinc oxide, cadmium oxide or a mixture of zinc oxide and cadmium oxide.

28. The process for producing a dielectric ceramic composition according to claim 26, wherein the molar ratio of said second component to said at least one third component is 1:3 to 3:1.

* * * * *